United States Patent

Coccoli et al.

[11] Patent Number: 5,321,449
[45] Date of Patent: Jun. 14, 1994

[54] PROJECTING FLASHLIGHT

[76] Inventors: Mario Coccoli, 801 Terrace Pl., Peekskill, N.Y. 10566; George Spector, 233 Broadway-Rm. 702, New York, N.Y. 10279

[21] Appl. No.: 950,694

[22] Filed: Sep. 25, 1992

[51] Int. Cl.⁵ .............................................. G03B 23/08
[52] U.S. Cl. ........................................................ 353/43
[58] Field of Search .................................... 353/43, 120

[56] References Cited

U.S. PATENT DOCUMENTS

| | | | |
|---|---|---|---|
| 2,478,336 | 8/1949 | Stein | 353/43 |
| 2,553,100 | 5/1951 | Lynch | 353/43 |
| 2,764,058 | 9/1956 | Ellis | 353/43 |
| 3,078,761 | 2/1967 | Zorn | 353/43 |
| 3,539,798 | 11/1970 | Perry | 353/43 |
| 4,858,003 | 8/1989 | Wirt et al. | 353/120 |

FOREIGN PATENT DOCUMENTS 0227502 1/1925 United Kingdom .................. 353/43

Primary Examiner—William A. Cuchlinski, Jr.
Assistant Examiner—William C. Dowling

[57] ABSTRACT

A projecting device is provided which consists of an enlarged head at one end of a flashlight, the enlarged head having a transverse slot therein. A lens is positioned at a front end of the enlarged head, while a light bulb is positioned at a back end of the enlarged head. A slide is insertable into the transverse slot in the enlarged head, so that an illuminated image from the slide may be projected onto a viewing surface.

1 Claim, 1 Drawing Sheet

U.S. Patent  June 14, 1994  5,321,449
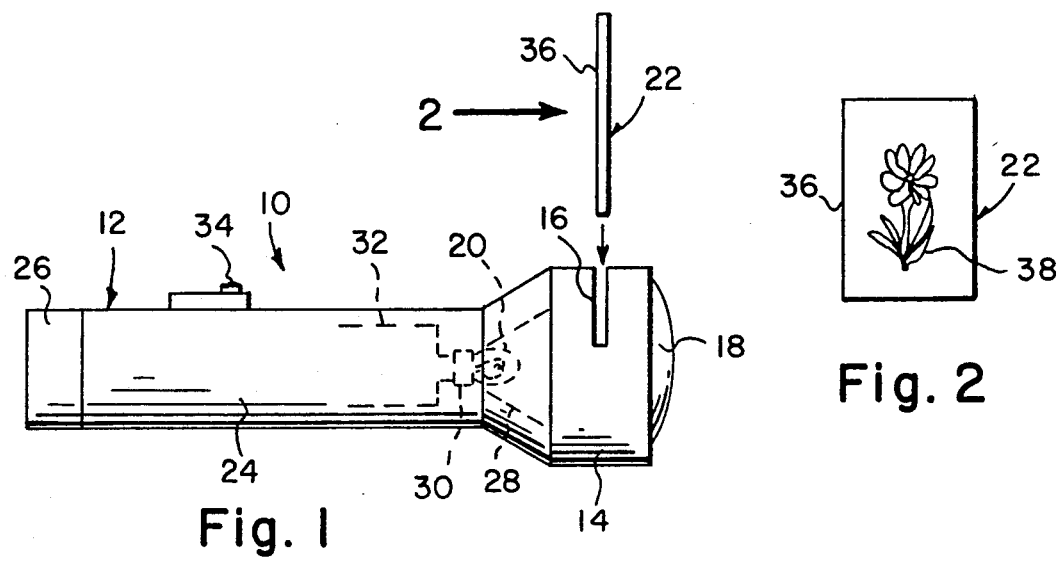
Fig. 1
Fig. 2
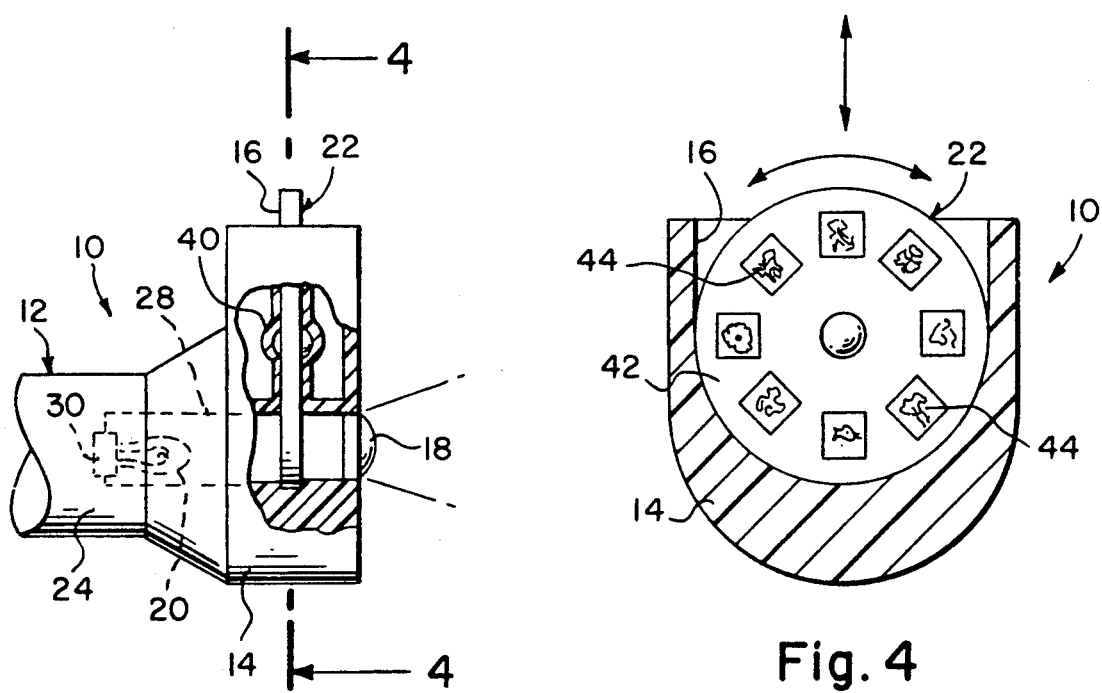
Fig. 3
Fig. 4

PROJECTING FLASHLIGHT

BACKGROUND OF THE INVENTION

The instant invention relates generally to image casting apparatuses and more specifically it relates to a projection device which provides a mechanism for projecting an illuminated image from an insertable slide onto a viewing surface.

There are available various conventional casting apparatuses which do not provide the novel improvements of the invention herein disclosed.

SUMMARY OF THE INVENTION

A primary object of the present invention is to provide a projecting device that will overcome the shortcomings of the prior art devices.

Another object is to provide a projecting device that contains a built-in mechanism for projecting an illuminated image from an insertable slide onto a viewing service.

An additional object is to provide a projecting device that is sized and shaped to be held in the hand and is especially intended to be used as an amusement toy for a young child.

A further object is to provide a projecting device that is simple and easy to use.

A still further object is to provide a projecting device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a diagrammatic side view of the instant invention with the slide ready to be inserted within the slot in a flashlight head.

FIG. 2 is an elevational view of the slide taken in direction of arrow 2 in FIG. 1.

FIG. 3 is a diagrammatic side view of a modification broken away with the rear part of the flashlight removed showing a rotatable multi-slide member inserted within the flexible holder in the flashlight head.

FIG. 4 is a diagrammatic cross sectional view taken along line 4—4 in FIG. 3 showing the multi-slide member within the flashlight head in greater detail.

DETAILED DESCRIPTION OF THE PREFERRED EMBODIMENTS

Turning now descriptively to the drawings, in which similar reference characters denote similar elements throughout the several views, the Figures illustrate a projecting device 10 which consists of a flashlight 12 with an enlarged head 14 at one end of the flashlight. The enlarged head 14 has a transverse slot 16 therein. A lens 18 is positioned at a front end of the enlarged head 14, while a light bulb 20 is positioned at a back end of the enlarged head 14. A slide 22 is insertable into the transverse slot 16 in the enlarged head, so that an illuminated image from the slide 22 may be projected onto a viewing surface.

The flashlight 12 contains an elongated cylindrical housing 24 with a cap 26 for closing an end of the housing 24 opposite from the enlarged head 14. A reflector 28 with an integral socket 30 is at the enlarged head 14, so that the light bulb 20 can be retained in the socket 30. A power source 32 is carried within the housing 24 for illuminating the light bulb 20. A switch 34 is carried on the housing 24 for turning the light bulb 20 on and off.

The slide 22 in FIGS. 1 and 2, is a rectangular shaped frame 36, having a single transparent picture 38 located thereon and is sized to fit into and be removed from the transverse slot 16 in the enlarged head 14.

The projecting device 10, shown in FIGS. 3 and 4, further includes a flexible holder 40 with a central socket located within the transverse slot 16 in the enlarged head 14. The slide 22 is a disc-shaped frame 42 having central ball shaped projections which fit rotatably in the socket whereby the frame is rotatable in slot 16 about the central socket and is removable from flexible holder 40.

When the disc-shaped frame 42 is inserted within the flexible holder 40 it can be manually rotated, so that each transparent picture 44 can be positioned between the lens 18 and the light bulb 20. The illuminated image can then be projected onto the viewing surface.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A projecting device which comprises:
   a) a flashlight with a central bore;
   b) an enlarged head with a semicircular portion and spaced straight tangential portions at one end of said flashlight, said enlarged head having spaced walls with a transverse slot therein intersecting said bore and extending through said tangential portions;
   c) a lens positioned at a front end of said enlarged head;
   d) a light bulb aligned with said bore positioned at a back end of said enlarged head;
   e) a slide with spaced picture slots alignable with said bore insertable into the transverse slot in said enlarged head, so that illuminated images from said slide may be sequentially projected onto a viewing surface;
   f) an elongated cylindrical housing;
   g) a cap for closing an end of said housing opposite from said enlarged head;
   h) a reflector with an integral socket at said enlarged head, so that said light bulb can be retained in said socket;
   i) a power source carried within said housing for illuminating said light bulb; and
   j) a switch carried on said housing for turning said light bulb on and off; further including:
   k) a flexible holder located within the transverse slot spaced from said end walls, said holder having a socket for rotatably mounting said slide;
   l) said slide being a disc-shaped frame having projections received rotatably in said socket and a plurality of transparent pictures mounted in said slots said slide being sized to fit into and be removed from said flexible holder; wherein said slots and pictures mounted therein are located at the same radial distance from said sockets as said bore.

* * * * *